United States Patent
Katamoto et al.

(10) Patent No.: US 6,200,376 B1
(45) Date of Patent: Mar. 13, 2001

(54) HEAT-RESISTANT YELLOW PIGMENT

(75) Inventors: Tsutomu Katamoto; Mamoru Fujimoto, both of Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/287,269

(22) Filed: Apr. 7, 1999

(30) Foreign Application Priority Data

Apr. 8, 1998 (JP) .................................................. 10-114107
Nov. 10, 1998 (JP) .................................................. 10-318944

(51) Int. Cl.[7] ................................. C09C 1/22; C09C 1/36
(52) U.S. Cl. ......................... 106/439; 106/442; 106/444; 106/459
(58) Field of Search .................................. 106/439, 442, 106/444, 459

(56) References Cited

U.S. PATENT DOCUMENTS 4,036,662 * 7/1977 Rademachers et al. ............. 106/439

FOREIGN PATENT DOCUMENTS

| 1201255 | * 3/1986 | (CA) . |
| 33 32 689 A1 | 3/1984 | (DE) . |
| 56-155251 | 12/1981 | (JP) . |
| 60-42236 | 3/1985 | (JP) . |
| 2-73362 | 3/1990 | (JP) . |
| 5-213620 | 8/1993 | (JP) . |
| 6-130719 | 5/1994 | (JP) . |
| 8-73224 | 3/1996 | (JP) . |
| 8-239223 | 9/1996 | (JP) . |
| 9-221323 | 8/1997 | (JP) . |

OTHER PUBLICATIONS

Abstract for JP 56–155,251.*
Grey et al, "nonstoichiometric Li–psudobrookite (SS) in the Li2O–Fe2O3–TiO2 System", Jour. Solid State Chem, 141, p. 221–28, 1998.*
Grey et al "Nonstoichiometric Li–pseudobrookite etc." J. of Solid State Chemistry vol. 141, No. 1, 1998, pp. 221–228, XP002109257.

* cited by examiner

Primary Examiner—C. Melissa Koslow
(74) Attorney, Agent, or Firm—Nixon & Vanderhye

(57) ABSTRACT

Heat-resistant yellow pigment particles of the present invention comprise a composite metal oxide containing Fe, Ti and Li, and comprising a crystal phase having a pseudobrookite-type structure. Such the heat-resistant yellow pigment particles are free from contamination of harmful metals such as Pb, Cr, Cd, etc., show a clear yellow color, are excellent in heat resistance, chemical resistance and light resistance, and have a low specific gravity.

14 Claims, 3 Drawing Sheets

HEAT-RESISTANT YELLOW PIGMENT

BACKGROUND OF THE INVENTION

The present invention relates to a heat-resistant yellow pigment particles, and more particularly, to heat-resistant yellow pigment particles which are free from contamination of harmful metals such as Pb, Cr, Cd, etc., show a clear yellow color, are excellent in heat resistance, chemical resistance and light resistance, and have a low specific gravity, and which comprises composite metal oxide particles comprising Fe, Ti and Li among which at least a part of Fe and/or Ti may be substituted with Al and/or Mg, and comprising a crystal phase having a pseudobrookite-type structure.

In addition, the heat-resistant yellow pigment particles according to the present invention, are useful as a yellow pigment for yellow paints used for road-signs, etc., because of clear yellow color and excellent heat resistance thereof.

As conventional inorganic yellow pigments, there have been extensively used chrome yellow ($PbCrO_4$), cadmium yellow (CdS.nZnS) or the like, since these pigments can exhibit an extremely clear yellow color. However, the chrome yellow comprises Cr and contains Pb which are harmful metals, and the cadmium yellow comprises Cd which is harmful metals. Therefore, for example, in the case where these pigments are used as yellow paints for road-signs, the harmful metals such as Pb, Cr and Cd tend to be eluted from coating films of these yellow paints due to corrosion, etc., resulting in causing environmental pollution. Accordingly, there arises a problem concerning safety.

On the other hand, many of known organic pigments which can show a clear yellow color, are harmful and have a low biodegradability in natural environment, so that the use thereof also causes a problem. In recent years, it has been required to use environment-favorable materials. In order to meet such a requirement, there has been a demand for providing inorganic yellow pigments containing no harmful.

Further, goethite ($\alpha$-FeOOH) which is known as inorganic yellow pigment showing a clear yellow color, is iron oxide hydroxide and, therefore, has no problem concerning safety. However, goethite undergoes the change in crystal structure and is transformed into red-colored hematite ($\alpha$-$Fe_2O_3$) when heat-dehydrated at a temperature of not less than about 230° C. Therefore, the goethite does not show a sufficient heat resistance required for a yellow pigment. Especially, the goethite cannot be used as a yellow pigment for yellow paints used for road-signs which tend to be exposed to more severe environmental conditions. This is because these yellow pigments for yellow paints used for road-signs are required to have a heat resistance which is capable of inhibiting occurrence of discoloration or color degradation even under a higher temperature condition of at least about 250° C.

In the case where the yellow pigment is used as a color pigment of the yellow paint, e.g., for road-signs or the like, the yellow paint is frequently exposed to wind or rain for a long period of time. Accordingly, the yellow pigment used is also required to have not only an acid resistance so as not to be readily dissolved in acid rains, but also an alkali resistance, i.e., required to show a chemical resistance.

Also, rutile-type titanium dioxide ($TiO_2$) have been extensively used as a white pigment for mixing of colors. It is known that the rutile-type titanium oxide has a photocatalytic effect. For this reason, when a pigment component contains the rutile-type titanium oxide, it is likely that a binder resin or the like used therewith is disadvantageously decomposed due to the photocatalytic effect thereof, resulting in deterioration of the light resistance. Therefore, the yellow pigment has been required to show a good light resistance.

In general, since inorganic pigments have a large true specific gravity, many of these inorganic pigments show a poor dispersion stability in paints. This is because the true specific gravity of the binder resin contained in the paint is about 1.5 at most, while the true specific gravity of the inorganic pigment dispersed in the paint is larger, e.g., 4.23 in the case of titanium dioxide particles and 5 in the case of magnetite particles, etc. For this reason, it has been demanded to provide a yellow pigment having a low specific gravity.

Under the above-mentioned circumstances, it has now been desired to provide inorganic yellow pigments which contain no harmful metals such as Pb, Cr or Cd, show a clear yellow color, are excellent in heat resistance, chemical resistance and light resistance, and have a low specific gravity.

Meanwhile, iron oxide and titanium oxide are oxides which are unharmful to human bodies, and can form composite oxides having various composition ratios. However, it is known that among typical ones of these composite oxides, for example, $FeTiO_3$ (ilmenite) shows a black color and $Fe_2TiO_5$ (pseudobrookite) shows a brown color. On the other hand, it has been reported that colored pigments having various color tones are obtained by first preparing $Fe_2TiO_5$ or the like from anatase-type titanium oxide ($TiO_2$) and hematite ($\alpha$-$Fe_2O_3$) as raw materials, and then mixing these minerals with white-colored rutile-type $TiO_2$ ("Coloring Material", 57, pp. 652 to 659 (1984); Japanese Patent Publication (KOKOKU) No. 49-46909(1974)).

Hitherto, there have been various attempts for producing yellow pigments composed mainly of composite metal oxide particles containing Fe and Ti. For example, there are known an inorganic yellow pigment composed of a solid solution constituted by $Fe_2TiO_5$ having a pseudobrookite lattice (pseudobrookite-type structure) and rutile-type or anatase-type titanium dioxide (Japanese Patent Application Laid-Open (KOKAI) No. 50-51128(1975)), and a pigment composed of a titanium oxide/iron oxide composite sol (Japanese Patent Application Laid-Open (KOKAI) No. 8-239223(1996)).

In addition, as pigments composed of composite metal oxide particles containing not only Fe and Ti but also other metal elements, there are known, for example, a yellow inorganic pigment composed of composite metal oxide particles containing titanium, iron and molybdenum (Japanese Patent Application Laid-Open (KOKAI) No. 60-42236(1985)), a yellow pigment constituted by a mixed material having a pseudobrookite-type crystal structure forming a solid solution with Al and a rutile-type crystal structure (Japanese Patent Application Laid-Open (KOKAI) No. 8-73224(1996)), and heat-resistant inorganic pigment particles composed of composite oxide containing Fe, Ti and other metals (Japanese Patent Application Laid-Open (KOKAI) No. 9-221323(1997)).

Further, as pigments composed of composite metal oxide particles containing Fe and Ti, in which alkali metal elements are further incorporated, there are known a pigment containing a metal oxide having a rutile-type or polyrutile-type structure and a metal fluorine compound as main components (Japanese Patent Publication (KOKOKU) No. 37-3460(1962)), and a yellow- to skin-colored pigment obtained by calcining a mixture having a specific composition, composed of an alkali metal compound, a ferric compound and titanium dioxide (Japanese Patent Publication (KOKOKU) No. 3-21580(1991)).

Although it have been desired to provide inorganic yellow pigments which are free from contamination of harmful metals such as Pb, Cr or Cd, show a clear yellow color, are excellent in heat resistance, chemical resistance and light resistance, and have a low specific gravity, the pigments described in the above prior arts are still unsatisfactory.

That is, the pigment described in Japanese Patent Application Laid-Open (KOKAI) No. 50-51128(1975) is composed of a mixture of pseudobrookite ($FeTiO_5$) and rutile-type or anatase-type titanium dioxide. Thus, the pigment show such a color tone obtained by color-mixing of brown-colored pseudobrookite ($FeTiO_5$) and white-colored titanium dioxide, but cannot show a clear color.

In the case of the pigment described in Japanese Patent Application Laid-Open (KOKAI) No. 8-239223(1996), since the titanium oxide/iron oxide composite sol is merely a mixture, the pigment does not have a crystal phase having a pseudobrookite-type structure.

The pigment described in Japanese Patent Application Laid-Open (KOKAI) No. 60-42236(1985) contains molybdenum as a heavy metal, and does not have a pseudobrookite-type structure.

The pigment described in Japanese Patent Application Laid-Open (KOKAI) No. 8-73224(1996) has a pseudobrookite-type structure forming a solid solution with Al, but does not contain Li.

The pigment described in Japanese Patent Application Laid-Open (KOKAI) No. 9-221323(1997) contains various metal elements in addition to Fe and Ti, but does not contain Li.

In Example of Japanese Patent Publication (KOKOKU) No. 37-3460(1962), there is described a pigment composed of a composite oxide containing Fe, Ti and Li. However, the composite oxide has a rutile-type or a polyrutile-type structure and is, therefore, deteriorated in light resistance.

As to the yellow pigment particles described in Japanese Patent Publication (KOKOKU) No. 3-21580(1991), the composite oxide containing Fe, Ti and Li is described in Example thereof. However, the composite oxide has a spinel-type structure and, therefore, cannot show a clear yellow color. Further, the pigment particles cannot exhibit a sufficient chemical resistance.

Accordingly, it is a technical subject of the present invention to provide inorganic yellow pigments which are free from contamination of harmful metals such as Pb, Cr or Cd, show a clear yellow color, are excellent in heat resistance, chemical resistance and light resistance, and have a low specific gravity.

As a result of the present inventor's earnest studies, it has been found that by mixing an Fe compound, an Ti compound and an Li compound together at specific ratios, calcining the mixture at a temperature of 700 to 1,000° C., and pulverizing the resultant calcined material into particles, there can be obtained a yellow pigment which can show a clear yellow color, are excellent in heat resistance, chemical resistance and light resistance, and have a low specific gravity. The present invention has been attained on the basis of the finding.

SUMMARY OF THE INVENTION

It is an object of the present invention to provide a heat-resistant yellow pigment which is free from contamination of harmful metals such as Pb, Cr or Cd, show a clear yellow color, is excellent in heat resistance, chemical resistance and light resistance, and have a low specific gravity, and which are useful as an inorganic yellow pigment for yellow paints used for road-signs.

It is another object of the present invention to provide a yellow paint and a rubber or resin composition having an excellent heat resistance.

To accomplish the aims, in a first aspect of the present invention, there are provided heat-resistant yellow pigment particles comprising a composite oxide containing Fe, Ti and Li, and comprising a crystal phase having a pseudobrookite-type structure.

In a second aspect of the present invention, there are provided heat-resistant yellow pigment particles comprising a composite oxide containing Fe, Ti and Li, at least a part of Fe, Ti or both Fe and Ti contained in the composite metal oxide particles being substituted with Al, Mg or both Al and Mg; and comprising a crystal phase having a pseudobrookite-type structure.

In a third aspect of the present invention, there is provided a pigment comprising the heat-resistant yellow pigment particles comprising a composite oxide containing Fe, Ti and Li, and comprising a crystal phase having a pseudobrookite-type structure.

In a fourth aspect of the present invention, there is provided a pigment comprising the heat-resistant yellow pigment particles comprising a composite oxide containing Fe, Ti and Li, at least a part of Fe, Ti or both Fe and Ti contained in the composite metal oxide particles being substituted with Al, Mg or both Al and Mg; and comprising a crystal phase having a pseudobrookite-type structure.

In a fifth aspect of the present invention, there is provided a paint comprising: the pigment comprising the heat-resistant yellow pigment particles comprising a composite oxide containing Fe, Ti and Li, and comprising a crystal phase having a pseudobrookite-type structure; and a paint base material.

In a sixth aspect of the present invention, there is provided a paint comprising: the pigment comprising the heat-resistant yellow pigment particles comprising a composite oxide containing Fe, Ti and Li, at least a part of Fe, Ti or both Fe and Ti contained in the composite metal oxide particles being substituted with Al, Mg or both Al and Mg, and comprising a crystal phase having a pseudobrookite-type structure; and a paint base material.

In a seventh aspect of the present invention, there is provided a rubber or resin composition comprising: the pigment comprising the heat-resistant yellow pigment particles comprising a composite oxide containing Fe, Ti and Li, and comprising a crystal phase having a pseudobrookite-type structure; and a base material for the rubber or resin composition.

In an eighth aspect of the present invention, there is provided a rubber or resin composition comprising: the pigment comprising the heat-resistant yellow pigment particles comprising a composite oxide containing Fe, Ti and Li, at least a part of Fe, Ti or both Fe and Ti contained in the composite metal oxide particles being substituted with Al, Mg or both Al and Mg, and comprising a crystal phase having a pseudobrookite-type structure; and a base material for the rubber or resin composition.

DETAILED DESCRIPTION OF THE INVENTION

First, heat-resistant yellow pigment particles according to the present invention are described.

The heat-resistant yellow pigment particles according to the present invention are constituted by composite metal oxide particles containing Fe, Ti and Li.

The heat-resistant yellow pigment particles according to the present invention have an average particle size of usually 0.1 to 3 μm, preferably 0.4 to 1.5 μm, and a BET specific surface area of usually 0.5 to 20 m²/g, preferably 1 to 8 m²/g.

The true specific gravity of the heat-resistant yellow pigment particles according to the present invention, is usually 3.6 to 4.3, preferably 3.7 to 4.2.

The composition percentages (atm %) of Fe, Ti and Li contained in the composite metal oxide particles as the heat-resistant yellow pigment particles according to the present invention, Fe of usually 17 to 55 atm %, preferably 20 to 48 atm %; Ti of usually 40 to 62 atm %, preferably 45 to 62 atm %; and Li of 5 to 22 atm %, preferably 5 to 20 atm %.

More specifically, the composition percentages of Fe, Ti and Li contained in the composite metal oxide particles as the heat-resistant yellow pigment particles according to the present invention, fall within a range surrounded by a pentangular shape formed by connecting Point 1 (17, 62, 21), Point 2 (33, 62, 5), Point 3 (55, 40, 5), Point 4 (38, 40, 22) and Point 5 (17, 61, 22) in a triangular phase diagram indicating atom ratios (atm %) of each metal element in the formula: 1/2(Fe₂O₃)—TiO₂—1/2(Li₂O), wherein numbers in a parenthesis of each point represent atom % of Fe, Ti and Li in this order by using as the corresponding coordinates in the triangular phase diagram.

As described hereinafter in Examples 1 to 3, in the case where the composition percentages of Fe, Ti and Li thereof are (20.6, 61.0, 18.4), (27.3, 57.8, 14.9) and (37.1, 50.5, 12.4), wherein numbers in each parenthesis represent atom % of Fe, Ti and Li in this order by using as the corresponding coordinates in the triangular phase diagram, it has been confirmed that the obtained pigment particles is constituted by a single crystal phase having a pseudobrookite-type structure.

The preferred composition percentages of Fe, Ti and Li fall within a range surrounded by a quadrangular shape formed by connecting Point 6 (20, 60, 20), Point 7 (30, 60, 10), Point 8 (45, 45, 10) and Point 9 (35, 45, 20) in the triangular phase diagram.

As to ratios between respective elements, the ratio of Ti to Li is usually 62:22 to 40:5, preferably 60:20 to 45:10; the ratio of Fe to Li is usually 17:22 to 55:5, preferably 20:20 to 45:10; and the ratio of Fe to Ti is usually 17:62 to 55:40, preferably 20:60 to 45:45.

The heat-resistant yellow pigment particles according to the present invention, is constituted by such a crystal phase composed primarily of a crystal phase having a pseudobrookite-type structure.

The composition of the above crystal phase having a pseudobrookite-type structure is represented by the formula:

$Fe_{2-x-y}Li_xTi_yTiO_5$ wherein x is 0.15 to 0.66; and y is 0.2 to 0.86.

The crystal system of the heat-resistant yellow pigment particles according to the present invention, is an orthorhombic system. As to lattice constants of the crystal system, a is 0.960 to 0.980 nm; b is 0.990 to 0.998 nm; and c is 0.369 to 0.376 nm.

In the heat-resistant yellow pigment particles according to the present invention, the crystal phase having a pseudobrookite-type structure has a volume percentage of usually 80 to 100 volume %, preferably 95 to 100 volume % based on the volume of the whole crystal phase when calculated from the integrated intensity of X-ray diffraction pattern. When the content is less than 80 volume %, the obtained pigment particles are unsatisfactory in yellow color, chemical resistance and light resistance.

Meanwhile, the heat-resistant yellow pigment particles according to the present invention, may contain such a crystal phase having a rutile-type structure of usually less than 20 volume %, preferably not more than 10 volume % based on the volume of the whole crystal phase when calculated from the integrated intensity of X-ray diffraction pattern. When the content of the crystal phase having a rutile-type structure is not less than 20 volume %, the obtained pigment particles are deteriorated in chroma and light resistance, though a lightness thereof is increased.

In addition, as other crystal phases which may be present in the pigment particles, a crystal phase having a spinel-type structure represented by the formula: $Li_xTi_{2x-1}Fe_{4-3x}O_4$, (wherein x is 0.5 to 1.33; whole solid solution-type) may be contained at a volume percentage of usually less than 10 volume %, preferably not more than 5 volume % based on the volume of the whole crystal phase when calculated from the integrated intensity of X-ray diffraction pattern. Further, when the reaction does not proceed to a sufficient extent, a hematite phase ($\alpha$-$Fe_2O_3$) may tend to be produced as an unreacted phase. In such a case, the content of the unreacted hematite phase is preferably not more than 5 volume % based on the volume of the whole crystal phase when calculated from the integrated intensity of X-ray diffraction pattern. The crystal phase having a spinel-type structure exhibits a brown color, so that when the crystal phase having a spinel-type structure is contained in an excessive amount, the obtained pigment particles is colored brownish, resulting in deterioration in lightness. Whereas, when the hematite phase is contained in an excessive amount, the obtained pigment particles are colored reddish and, therefore, no longer useful as a yellow pigment.

Incidentally, it is preferred that no magnetite phase ($Fe_3O_4$) is contained in the pigment.

The heat-resistant yellow pigment particles according to the present invention, exhibit a clear yellow color. When the color tone of the heat-resistant yellow pigment particles is represented by L*a*b* method, the L* value (lightness) is usually not less than 48, preferably not less than 55, and the upper limit of the L* value is preferably 85; the a* value is usually 8 to 25, preferably 10 to 22; and the b* value is usually 38 to 55, preferably 40 to 55. In addition, the C* value (chroma) is usually not less than 43, preferably not less than 45, and the upper limit of the C* value is preferably 65; and the H* value (hue) is usually not less than 62, preferably not less than 65, and the upper limit of the H* value is preferably 85.

When a certain amount of the crystal phase having a spinel-type structure is contained, the lightness and the chroma of the pigment particles tend to be deteriorated. Whereas, when a certain amount of the crystal phase having a rutile-type structure is contained, the chroma of the pigment particles tend to be deteriorated.

The heat-resistant yellow pigment particles according to the present invention, have a heat resistance of usually not less than 300° C., preferably not less than 600° C., more preferably 670° C.

Here, the heat-resistance is represented by the temperature at which any discoloration is not recognized by visual observation after the pigment particles are heated to that temperature in air and then cooled, when being compared to the color tone before heating.

As to the chemical resistance of the yellow pigment particles according to the present invention, it is preferred that the pigment particles can show such an acid resistance that no discoloration is caused even after being immersed in a 5% (1.6N) aqueous hydrochloric acid solution for 10 minutes, preferably 24 minutes, and such an alkali resistance that no discoloration is caused even after being immersed in a 1% aqueous sodium hydroxide solution for 15 minutes.

Further, the heat-resistant yellow pigment particles according to the present invention, have such a light resistance that the percentage of change in gloss of a coating film containing the pigment particles is usually not more than 23%, preferably not more than 20%, when measured by the method described in detail hereinafter.

The heat-resistant yellow pigment particles according to the present invention comprise composite metal oxide particles containing Fe, Ti and Li, wherein at least a part of Fe, Ti or both Fe and Ti may be substituted with Al, Mg or both Al and Mg.

The composition percentages (atm %) of Fe, Ti and Li contained in the composite metal oxide particles as the heat-resistant yellow pigment particles according to the present invention in which at least a part of Fe, Ti or both Fe and Ti are substituted with Al, Mg or both Al and Mg, is Fe of usually 15 to 55 atm %, preferably 16 to 45 atm %; Ti of usually 25 to 65 atm %, preferably 25 to 62 atm %; and Li of usually 5 to 22 atm %, preferably 6 to 21 atm %. In addition, the content of Al in the composite metal oxide particles is preferably 1 to 30 atm %, more preferably 1 to 20 atm % based on the whole metals; and the content of Mg in the composite metal oxide particles is preferably 1 to 20 atm %, more preferably 1 to 15 atm % based on the whole metals. When at least a part of Fe, Ti or both Fe and Ti are substituted with both Al and Mg, the content of Al and Mg in the composite metal oxide particles is preferably 1 to 30 atm %, more preferably 1 to 20 atm % based on the whole metals.

When the content of Al is more than 30 atm %, hematite, alumina and rutile are by-produced in addition to the aimed heat-resistant yellow pigment particles.

When the content of Mg is more than 20 atm %, MgO, hematite and rutile are by-produced in addition to the aimed heat-resistant yellow pigment particles.

When the total content of Al and Mg is more than 30 atm %, hematite, alumina, rutile and MgO are by-produced in addition to the aimed heat-resistant yellow pigment particles.

The heat-resistant yellow pigment particles according to the present invention in which at least a part of Fe, Ti or both Fe and Ti are substituted with Al, Mg or both Al and Mg, is constituted by such a crystal phase composed primarily of a crystal phase having a pseudobrookite-type structure. The composition of the crystal phase is represented by the formula:

$$Fe_{2-p-q-r-s}Li_pMg_qAl_rTi_sO_5$$

wherein p is more than 0.15 and less than 0.66; q is more than 0.03 and less than 0.60; r is more than 0.03 and less than 0.90; and s is more than 0.75 and less than 1.95.

The true specific gravity of the heat-resistant yellow pigment particles in which at least a part of Fe, Ti or both Fe and Ti are substituted with Al, Mg or both Al and Mg, is usually 3.4 to 4.3, preferably 3.5 to 4.2.

The heat-resistant yellow pigment particles in which at least a part of Fe, Ti or both Fe and Ti are substituted with Al, Mg or both Al and Mg, can show similar properties including crystal system, lattice constants, kinds of other crystal phases and volume percentages as well as average particle size, BET specific surface area, color tone, heat resistance, chemical resistance and light resistance, to those of the heat-resistant yellow pigment particles according to the present invention which are neither substituted with Al nor Mg.

By using the heat-resistant yellow pigment particles according to the present invention, it is possible to obtain a yellow paint capable of showing a good heat resistance and a clear yellow color. Such a yellow paint can be suitably used as a yellow paint for road-signs which is required to have an excellent heat resistance.

Next, the process for producing the heat-resistant yellow pigment particles according to the present invention, is described.

The heat-resistant yellow pigment particles according to the present invention, can be produced by mixing an Fe compound, an Ti compound, an Li compound and, if required, an Al compound, an Mg compound or both Al and Mg compounds with each other at a specific mixing ratio, calcining the mixture at a temperature of 700 to 1,100° C., pulverizing the obtained calcined product, and further optionally subjecting the pulverized product to washing treatment and classification.

As the Fe compound used in the present invention, there may be exemplified iron salts such as iron chloride, iron nitride, iron oxalate and iron sulfate; iron oxide hydroxides such as goethite ($\alpha$-FeOOH), akaganeite ($\beta$-FeOOH) and lepidocrocite ($\gamma$-FeOOH); iron oxides such as hematite ($\alpha$-$Fe_2O_3$), maghemite ($\gamma$-$Fe_2O_3$), magnetite ($Fe_3O_4$) and berthollide; metallic irons such as iron powder; or the like.

The particle size of the Fe compound is preferably 0.01 to 2.0 $\mu$m.

The amount of the Fe compound mixed is usually 17 to 55 atm %, preferably 20 to 45 atm % (calculated as Fe).

In the case where the Al compound and/or the Mg compound are mixed together, the amount of the Fe compound mixed is usually 15 to 55 atm %, preferably 16 to 45 atm %.

As the Ti compound used in the present invention, there may be exemplified $TiO_2 \cdot nH_2O$; titanium dioxides ($TiO_2$) such as rutile-type or anatase-type titanium dioxide; non-stoichiometric titanium oxides ($TiO_x$); or the like.

The particle size of the Ti compound is preferably 0.01 to 0.8 $\mu$m.

The amount of the Ti compound mixed is usually 40 to 62 atm %, preferably 45 to 60 atm % (calculated as Ti).

In the case where the Al compound and/or the Mg compound are mixed together, the amount of the Ti compound mixed is usually 25 to 65 atm %, preferably 25 to 62 atm % (calculated as Al).

As the Li compound used in the present invention, there may be exemplified lithium carbonate, lithium acetate, lithium nitrate, lithium sulfate, lithium chloride, or the like.

The amount of the Li compound mixed is usually 5 to 30 atm %, preferably 10 to 20 atm % (calculated as Li).

Incidentally, an oxide of Fe and Ti can be used instead of the above-mentioned Fe compound and Ti compound. As the oxide of Fe and Ti, there may be exemplified $FeTiO_3$ (ilmenite), $Fe_2TiO_5$ (pseudobrookite), or the like. Also, an oxide of Ti and Li can be used instead of the above-mentioned Ti compound and Li compound. As the oxide of Ti and Li, there may be exemplified lithium titanate ($Li_2TiO_3$) or the like.

In addition, as to the mixing ratios between the Fe compound, the Ti compound and the Li compound in the mixture, the ratio of Ti to Li is usually 62:22 to 40:5, preferably 60:20 to 45:10 (calculated as Ti and Li); the ratio of Fe to Li is usually 17:22 to 55:5, preferably 20:20 to 45:10 (calculated as Fe and Li); and the ratio of Fe to Ti is usually 17:62 to 55:40, preferably 20:60 to 45:45 (calculated as Fe and Ti).

Further, in the case where the Al compound and/or the Mg compound are mixed together, the amounts of the Fe compound, the Ti compound and the Li compound mixed are determined so as to obtain heat-resistant yellow pigment particles having the aimed composition.

As the Al compound used in the present invention, there may be exemplified boehmite, gibbsite, $Al(OH)_3$, aluminum nitrate, aluminum chloride, or the like.

The particle size of the Al compound is preferably 0.01 to 2.0 $\mu$m.

The amount of the Al compound mixed is usually 1 to 30 atm %, preferably 1 to 20 atm % (calculated as Al) based on whole metals.

As the Mg compound used in the present invention, there may be exemplified magnesium oxide, magnesium hydroxide, basic magnesium carbonate, magnesium nitrate, magnesium chloride, or the like.

The particle size of the Mg compound is preferably 0.01 to 2.0 $\mu$m.

The amount of the Mg compound mixed is usually 1 to 20 atm %, preferably 1 to 15 atm % (calculated as Mg) based on whole metals.

In the present invention, compounds containing both Mg and Al such as hydrotalcite may be used.

In the case where both the Al and Mg compounds are used, the total amount of the Al and Mg compounds mixed is preferably 1 to 30 atm %, more preferably 2 to 28 atm % (calculated as Al and Mg) based on whole metals.

In the present invention, the mixing of the Fe compound, the Ti compound, the Li compound and, if required, the Al compound, the Mg compound or both the Al and Mg compounds, may be conducted by either a dry method or a wet method, using, for example, an attrition mill, an epicyclic ball mill, a dry ball mill or the like.

The calcining temperature in the present invention is usually 700 to 1,100° C., preferably 800 to 1,050° C. When the heat-calcination is conducted at a temperature of more than 1,100° C., the sintering may be caused within or between particles, so that there tend to be caused disadvantages such as growth of coarse particles or difficulty in pulverization. In the case where lithium carbonate is used as a raw material, the heat-calcination can be conducted at a relatively low temperature due to its flux effect.

In addition, the heat-calcination can be well conducted in an oxidative atmosphere such as in air. When the heat-calcination is conducted in a reducing atmosphere, the iron component is reduced into $Fe^{2+}$ ions, so that the pigment particles containing such $Fe^{2+}$ ions are disadvantageously colored blackish.

The pulverization may be conducted by an ordinary method, for example, using a free-type pulverizer, a sand mill, an attrition mill or the like.

Incidentally, the washing treatment and the classification may be optionally conducted according to requirements.

The yellow pigment according to the present invention may be used as color pigments for a water-based paint, a solvent-based paint and a rubber or resin composition.

Next, the water-based paint and solvent-based paint according to the present invention is described as follows.

The water-based paint according to the present invention is a paint prepared by using water as a main solvent, and therefore, includes both water-soluble paints and water-dispersion paints. The water-dispersion paints may further include emulsion-type paints and colloidal dispersion-type paints. The water-based paint according to the present invention comprises a paint base material and a color pigment dispersed therein. The amount of the color pigment dispersed may be in the range of 1.0 to 100 parts by weight based on 100 parts by weight of the paint base material. In view of handling of the obtained paint, the amount of the color pigment dispersed is preferably in the range of 2.0 to 100 parts by weight, more preferably 5.0 to 100 parts by weight based on 100 parts by weight of the paint base material.

Meanwhile, the color pigment according to the present invention can also be suitably applied to organic solvent-type paints. In this case, the organic solvent-type paint comprises a paint base material and a color pigment dispersed therein. The amount of the color pigment dispersed may be in the range of 1.0 to 100 parts by weight based on 100 parts by weight of the basic constituting material. In view of handling of the obtained organic solvent-type paint, the amount of the pigment dispersed is preferably 2.0 to 100 parts by weight, more preferably 5.0 to 100 parts by weight based on 100 parts by weight of the paint base material.

The paint base material may contain, if required, extender pigment particles, a drying accelerator, a surfactant, a curing promoter, auxiliaries or the like.

The amount of the solvent used in the paint according to the present invention is preferably 50 to 5,000 parts by weight, more preferably 100 to 2,000 parts by weight based on 100 parts by weight of the resin. When the amount of the solvent is less than 50 parts by weight based on 100 parts by weight of the resin, the vehicle viscosity of the paint may become too high so that it is difficult to perform homogeneous mixing and dispersion. On the other hand, when the amount of the solvent is more than 5,000 parts by weight, the solvent content in the paint may increase to such an extent that the dispersing shear force does not act on the particles during mixing and dispersion.

The resins for water-based paints usable in the present invention may include those commonly used for this purpose, such as water-soluble alkyd resins, water-soluble acrylic resins, water-soluble urethane resins, water-soluble epoxy resins, water-soluble melamine resins, acrylic emulsion resin, acrylic styrene emulsion resins, urethane emulsion resins, epoxy emulsion resins, vinyl acetate emulsion resins or the like.

As the resins for organic solvent-type paints, there can be used those commonly used for this purpose, such as acrylic resins, alkyd resins, polyester resins, polyurethane resins, epoxy resins, phenol resins, melamine resins, amino resins or the like.

Examples of the solvents for water-based paints used in the present invention may include those commonly used for this purpose, such as water, butyl cellosolve, ethyl cellosolve, propylene glycol, monomethyl ether, methyl cellosolve acetate, butoxyethyl acetate, ethoxyethanol, hexoxyethanol, methyl ethyl ketone, phenyl glycol ether, ethanol, butyl alcohol, butoxyethanol, propanol, propoxypropanol or the like.

As the solvents for organic solvent-type paints, there can be exemplified those commonly used for this purpose, such as toluene, xylene, butyl acetate, methyl acetate, methyl isobutyl ketone, butyl cellosolve, ethyl cellosolve, butyl alcohol, aliphatic hydrocarbons or the like.

As the defoaming agents used in the present invention, there may be exemplified commercially available products such as NOPCO 8034, SN DEFOAMER 477, SN DEFOAMER 5013, SN DEFOAMER 247, SN DEFOAMER 382 (tradenames: produced by SANNOPCO Co., LTD.), ANTIFOAM 08, EMULGEN 903 (tradenames: produced by KAO CO., LTD.) or BYK-020 (tradename: produced by BYK CO., LTD.).

In the water-based paints, there may also be used film-forming assistants such as alcohols or glycol ethers.

The emulsion-type paints can be prepared by adding a pigment, an additive, water and if necessary, an organic solvent to an emulsion resin. As the additives, there may be exemplified dispersant, rust preventive, defoaming agent, film-forming agent or the like. As the film-forming agents, there may be used higher alcohols, glycols and hydrocarbons.

The colloidal dispersion-type paints may be composed of a colloidal dispersion resin, a pigment, an additive, a neutralizer, water, an organic solvent or the like.

As the additives for the colloidal dispersion-type paints, there may be exemplified dispersant, defoaming agent, rust preventive or the like, i.e., the same additives as those for the emulsion-type paints except film-forming agent.

The water-based paints may be composed of a water-soluble resin, a pigment, an additive, water, an organic solvents or the like. As the additives for the water-based paints, there may be exemplified dispersant, defoaming agent, neutralizer, rust preventive or the like.

In addition, if required, the water-based paint may further contain extender pigment, aggregate, neutralizer, film-forming assistant, pigment dispersant, pigment wetting agent, thickener (viscosity-imparting agent), antiseptic agent, mildew proofing agent, antifreezing agent, rust preventive, dryer or the like.

The water-based paint according to the present invention can be produced by dispersing the pigment according to the present invention and the above-mentioned paint base material in specific weight ratios in water by a commonly used mixer such as ball mill, roll mill, homomixer, shaker, attritor or sand grinder.

The paint containing the heat-resistant yellow pigment particles according to the present invention, has a gloss of usually 40 to 100%, preferably 50 to 100% when formed into a coating film. The heat-resisting temperature of the coating film is usually not less than 275° C., preferably not less than 280° C. As to the hue of the coating film, the $L^*$ value is preferably 48 to 85; the $a^*$ value is preferably 8 to 25; and the $b^*$ value is preferably 40 to 55.

The rubber or resin composition according to the present invention is described in detail.

In the rubber or resin composition according to the present invention, the color pigment may be blended therein in an amount of 0.1 to 200 parts by weight based on 100 parts by weight of a constituent base material for the rubber or resin composition. In view of easiness in handling the rubber or resin composition, the amount of the color pigment blended therein is preferably in the range of 0.2 to 150 parts by weight, more preferably 0.4 to 50 parts by weight.

As the rubbers or resins usable in the present invention, there may be exemplified natural rubbers, synthetic rubbers, thermoplastic resins such as polyvinyl chloride, polyethylene, polypropylene, styrene polymers, polyamides or polyolefins, or the like.

The constituent base material for the rubber or resin composition according to the present invention may contain a conventional rubber or thermoplastic resin and if required, other additives such as a lubricant, a plasticizer, an antioxidant, an ultraviolet light absorber or various other stabilizers.

The amount of the additive added is not more than 50% by weight based on the total weight of the color pigment and the rubber or the thermoplastic resin. When the amount of the additive added is more than 50% by weight, the moldability of the composition is deteriorated.

The rubber or resin composition according to the present invention can be used in the form of a molded product which is prepared by preliminarily intimately mixing the rubber or resin raw material and the color pigment with each other, applying an intense shearing force to the mixture while heating by using a kneader or an extruder to destroy aggregates of the color pigment and homogeneously disperse the color pigment in the rubber or the resin, and thereafter molding the resultant mixture into an aimed shape.

The rubber or resin composition which is colored by using the heat-resistant yellow pigment particles according to the present invention, has a heat-resisting temperature of usually not less than 205° C., preferably not less than 210° C. As to the hue of the rubber or resin composition, the $L^*$ value is preferably 48 to 85; the $a^*$ value is preferably 8 to 25; and the $b^*$ value is preferably 40 to 55.

The reason why the composite metal oxide particles comprising Fe, Ti and Li as the heat-resistant yellow pigment particles according to the present invention can show a clear yellow color nevertheless $Fe_2TiO_5$ (pseudobrookite) containing only Fe and Ti shows a brown color, is considered as follow.

First, the reason why the solid solution formed by incorporating Li in $Fe_2TiO_5$ (pseudobrookite) can still maintain a pseudobrookite structure, is considered as follows. That is, since the ion radius of Li is substantially identical to that of Fe or Ti, Fe or Ti can be readily substituted with Li in view of the crystal structure.

Accordingly, when Li is incorporated into $Fe_2TiO_5$ to form a solid solution therewith, there can be obtained such a crystal phase having a pseudobrookite-type structure whose composition is continuously varied. However, due to the fact that any crystal phase containing only Ti and Li without Fe has not been obtained, it is considered that there exists a certain limit concerning the amount of Li incorporated in $Fe_2TiO_5$ to form a solid solution therewith.

In the pseudobrookite-type structure, there are present two sites to which metal ions can be incorporated (bonded), i.e., 4c and 8f. Further, it has been found that in the X-ray diffraction pattern of the composite metal oxide particles as the heat-resistant yellow pigment particles according to the present invention, there are observed some diffraction peaks which never appear in that of ordinary $Fe_2TiO_5$ (pseudobrookite). From the analysis of the X-ray diffraction pattern, it has been recognized that Li is selectively incorporated into (bonded to) the site 4c among the two sites, resulting in reducing a probability of bonding Ti to the site 4c. Such a selective bonding of Li is considered to be the reason why the specific diffraction peaks are observed in the X-ray diffraction pattern of the composite metal oxide particles as the heat-resistant yellow pigment particles according to the present invention.

That is, in an ordinary pseudobrookite-type structure, Fe occupies all of sites 8f, so that a large light absorption is caused over a wide wavelength range, resulting in showing a brown color. On the other hand, in the composite metal oxide particles as the heat-resistant yellow pigment particles according to the present invention, the sites 8f are occupied by both Ti and Fe, so that the concentration of Fe is decreased, resulting in showing a clear yellow color. In the spinel-type structure, although the concentration of Fe is almost the same as that of the composite metal oxide particles as the heat-resistant yellow pigment particles according to the present invention, the Fe ions are caused to exist at two kinds of sites, so that the light absorption effect due to the Fe ions occupying the two kinds of sites becomes stronger than the effect of decreasing the concentration of Fe, resulting in showing a brown color.

In addition, the reason why the heat-resistant yellow pigment particles according to the present invention, are excellent in heat resistance, chemical resistance and light resistance, is considered as follow. That is, there is caused a synergistic effect based on the facts that assuming that the Li ions are incorporated into (bonded to) the sites 4c, the Li ions are inhibited from being readily shifted in the crystal as described above, and that the crystal phase having a pseudobrookite-type structure cannot be easily dissolved in acid or alkali.

The heat-resistant yellow pigment particles according to the present invention can be produced by an ordinary heating method, i.e., heat-calcination in air and are, therefore, excellent in heat resistance.

Also, the heat-resistant yellow pigment particles according to the present invention are excellent in light resistance since the pigment particles contain the crystal phase having a rutile-type structure only in an amount of less than 20 volume %.

Further, the composite metal oxide particles as the heat-resistant yellow pigment particles according to the present invention, in which at least a part of Fe, Ti or both Fe and Ti is substituted with Al, Mg or both Al and Mg, can also still maintain a pseudobrookite-type structure, and can exhibit a clear yellow color due to the decreased concentration of Fe, and excellent heat resistance, chemical resistance and light resistance.

As described above, the heat-resistant yellow pigment particles according to the present invention which contain Fe, Ti and Li and in which at least a part of Fe, Ti or both Fe and Ti may be substituted with Al, Mg or both Al and Mg, are free from contamination of harmful metals such as Pb, Cr, Cd or the like, show a clear yellow color, are excellent in heat resistance, chemical resistance and light resistance, and have a low specific gravity. Therefore, the heat-resistant yellow pigment particles according to the present invention, are useful and free from environmental pollution.

Further, the heat-resistant yellow pigment particles according to the present invention, are useful as yellow pigment particles for a yellow paint used for road-signs, because of clear yellow color and excellent heat resistance thereof.

EXAMPLES

The present invention will now be described in more detail with reference to the following examples and comparative examples, but the present invention is not restricted to those examples and various modifications are possible within the scope of the invention.

The properties in the examples were measured by the following methods.

(1) The particle size of the pigment particles is expressed by an average value of particle sizes of 250 particles measured from an electron micrograph. The BET specific surface area is expressed by the value measured by a BET method. The true specific gravity is expressed by a value measured by a pycnometer.

(2) The identification of the crystal phase of the pigment particles is conducted by an X-ray diffraction method (target: Fe, lamp voltage: 40 kV, lamp current: 20 mA). The volume percentage of each crystal phase is expressed by a percentage of the integrated intensity calculated from the X-ray diffraction pattern.

(3) The contents of Fe, Ti, Al, Mg and Li elements constituting the pigment particles are expressed by the values measured by using an inductively coupled plasma atomic emission spectroscope "SPS4000" (manufactured by Seiko Denshi Kogyo Co., Ltd.).

(4) As to the colorimetric values, the L* value (lightness), a* value and b* value of respective test pieces in a Hunter's Lab space are expressed by values measured by using a multi-spectro-colour-meter MSC-IS-2D (manufactured by Suga Testing Machine Manufacturing Co., Ltd.).

The C* value (chroma) is calculated according to the following formula:

$$C^*=(a^*\times a^*+b^*\times b^*)^{1/2}$$

Further, the H* value (hue) is calculated according to the following formula:

$$H^*=\tan^{-1}(b^*/a^*)$$

Test pieces were obtained by using (i) a solvent-based paint prepared by the following method, (ii) a water-based paint prepared by the method of Example 16, and (iii) a resin composition prepared by the method of Example 21.

(i) 0.5 g of sample particles and 0.5 cc of castor oil were kneaded together by a Hoover's muller, thereby forming a paste. 4.5 g of a clear lacquer was added to the obtained paste, and the mixture was kneaded to form a paint. The obtained paint was applied onto a cast-coated paper using a 6-mil applicator, thereby producing a coating film piece (having a thickness of about 30 μm).

(ii) The water-based paint prepared by the below-mentioned method is applied onto a cold-rolled steel plate (having a size of 0.8 mm×70 mm×150 mm: JIS G-3141) and then dried so as to form a test piece having a 150 μm-thick coating film thereon.

(5) As to the chemical resistance of the pigment particles, the acid resistance is determined by observing the change in color tone thereof when the pigment particles are immersed in a 5% (1.6 N) aqueous hydrochloric acid solution for 10 minutes. Whereas, the alkali resistance of the pigment particles is determined by observing the change in color tone thereof when the pigment particles are immersed in a 1% aqueous sodium hydroxide solution for 10 minutes.

The results of the acid resistance and the alkali resistance of the pigment particles are classified into the following three ranks:

O: No discoloration or color degradation was caused.

Δ: Discoloration or color degradation was caused slightly.

x: Severe discoloration or color degradation was caused.

(6) The light resistance of the pigment particles is evaluated by subjecting a coating film prepared from a paint containing the pigment particles to an accelerated exposure test.

That is, 20 parts by weight of the pigment particles and 100 parts by weight of a paint base material (composed of 15 parts by weight of a melamine resin and 85 parts by weight of a dry alkyd resin) were mixed and then dispersed together for 24 hours by a ball mill (in which 10 mmφ glass beads were used as a dispersing medium), thereby producing a paint. The obtained paint was applied on a glass plate, and then baked and hardened at 120° C. for 30 minutes, thereby forming a coating film. The obtained coating film was subjected to an accelerated exposure test using a sunshine-weatherometer. After the accelerated test was continued for 1,000 hours (equivalent to 3 years under natural environment), the gloss of the coating film was measured. The light resistance of the pigment particles is expressed by the change in gloss before and after the accelerated exposure test.

(7) The heat resistance of the pigment particles is expressed by the temperature at which discoloration or color degradation of the pigment particles is first recognized by visual observation when the pigment particles are re-heated to that temperature in air and then cooled.

(8) The heat-resistance of a coating film containing the heat-resistant yellow pigment particles, is determined as follows. That is, the above test piece is placed in an oven, and heat-treated therein while varying the temperature of the oven. The heat-treatment is conducted for 15 minutes at each oven temperature. The hues (L* value, a* value and b* value) of the coating film before and after the heat-treatment at each oven temperature are measured by using a multi-spectro-colour-meter (MSC-IS-2D manufactured by Suga Testing Machine Manufacturing, Co., Ltd.). Based on the measured values, ΔE* values are obtained according to the following formula:

$$\Delta E^* = \{(\Delta L^*)^2 + (\Delta a^*)^2 + (\Delta b^*)^2\}^{1/2}$$

wherein ΔE* represents the difference in hue between before and after the heat-treatment; and ΔL*, Δa* and Δb* represent differences in L*, a* and b* values between before and after the heat-treatment, respectively.

Using a semi-logarithmic graph, the heating temperatures are plotted on an abscissa axis, and the ΔE* values are plotted on an ordinate axis. The temperature at which the ΔE* value is identical to 1.5, is determined as the heat-resisting temperature of the coating film.

(9) The heat resistance of the rubber or resin composition colored by the heat-resistant yellow pigment particles is determined as follows. That is, a sheet piece (20 mm×20 mm) used in Examples hereinafter is placed in an oven maintained at 180° C. in air, and subjected to a heat-resistant test. The time at which a whole part of the sheet piece is blackened, is determined as the heat-resisting time of the rubber or resin composition.

(10) The dispersibility of the heat-resistant yellow pigment particles is expressed by the gloss measured by irradiating the above coating film piece with light at an incident angle of 60°, using a glossmeter UGV-5D (manufactured by Suga Testing Machine Manufacturing, Co., Ltd.). The higher the gloss, the more excellent the dispersibility.

(11) The dispersibility of the resin composition is evaluated as follows. The number of undispersed aggregate particles on a surface of the obtained resin composition were visually counted. The results are classified into the following five ranks. The 5th rank represents most excellent dispersing condition.

Rank 5: No undispersed particles were recognized;

Rank 4: 1 to 4 undispersed aggregate particles per 1 $cm^2$ were recognized;

Rank 3: 5 to 9 undispersed aggregate particles per 1 $cm^2$ were recognized;

Rank 2: 10 to 49 undispersed aggregate particles per 1 $cm^2$ were recognized;

Rank 1: not less than 50 undispersed aggregate particles per 1 $cm^2$ were recognized.

EXAMPLE 1

<Production of Heat-resistant Yellow Pigment Particles>

8.90 g of goethite particles (average particle size: 1 μm), 24 g of titanium dioxide (average particle size: 0.2 μm) and 3.7 g of lithium carbonate were mixed together by an attrition mill. Thereafter, the mixture was placed in an alumina crucible and heat-calcined in air at 900° C. for one hour, and then the calcined product was pulverized by an attrition mill, thereby obtaining pigment particles.

Figure 1:
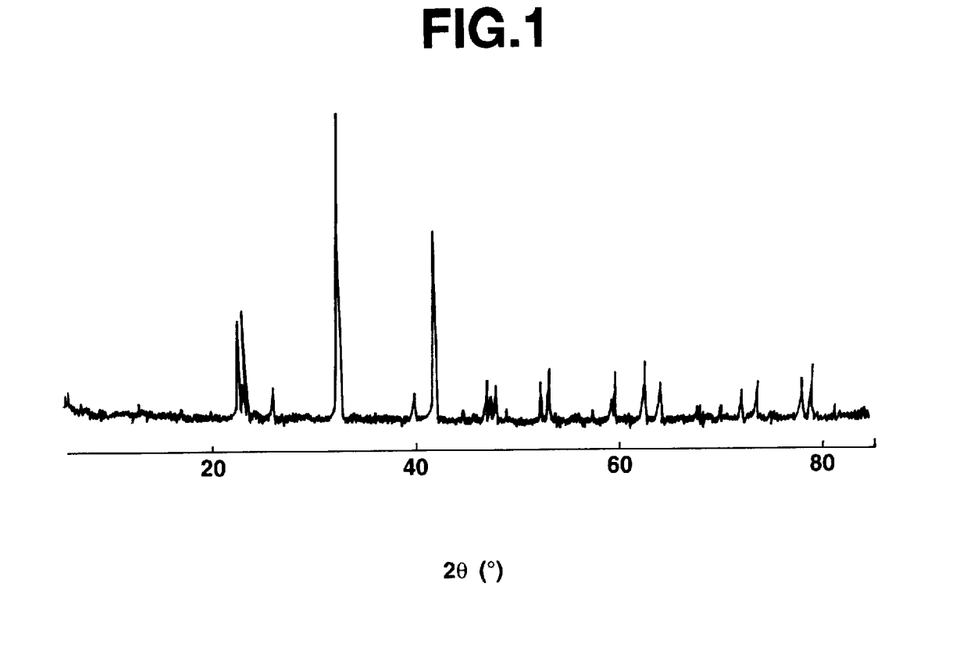
FIG. 1 is an X-ray diffraction pattern showing a crystal structure of heat-resistant yellow pigment particles obtained in Example 1.
Figure 2:
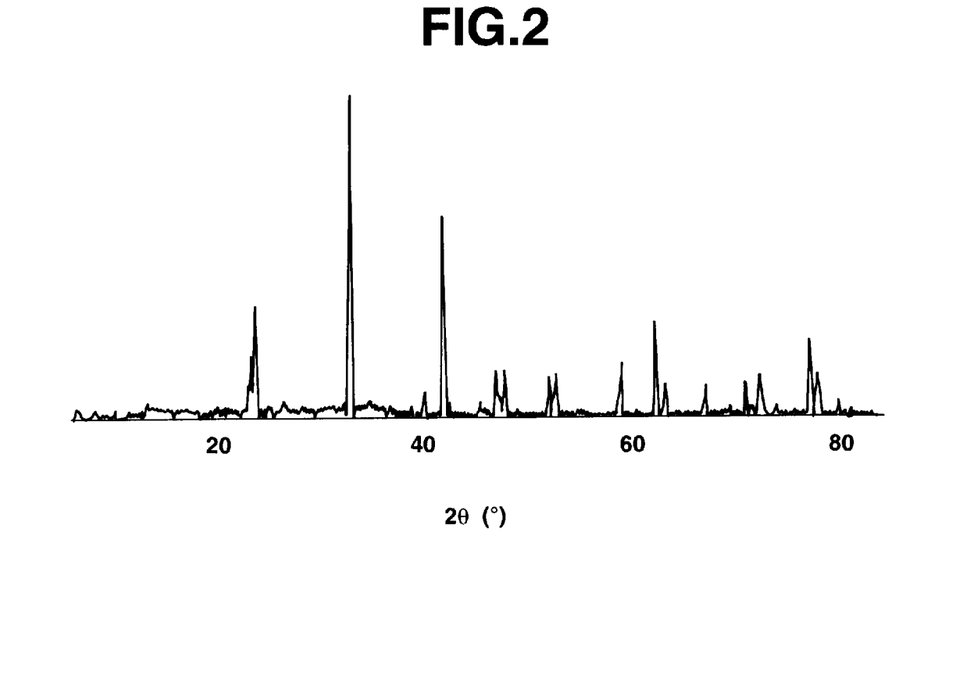
FIG. 2 is an X-ray diffraction pattern showing a crystal structure of yellow pigment particles obtained in Example 7.
Figure 3:
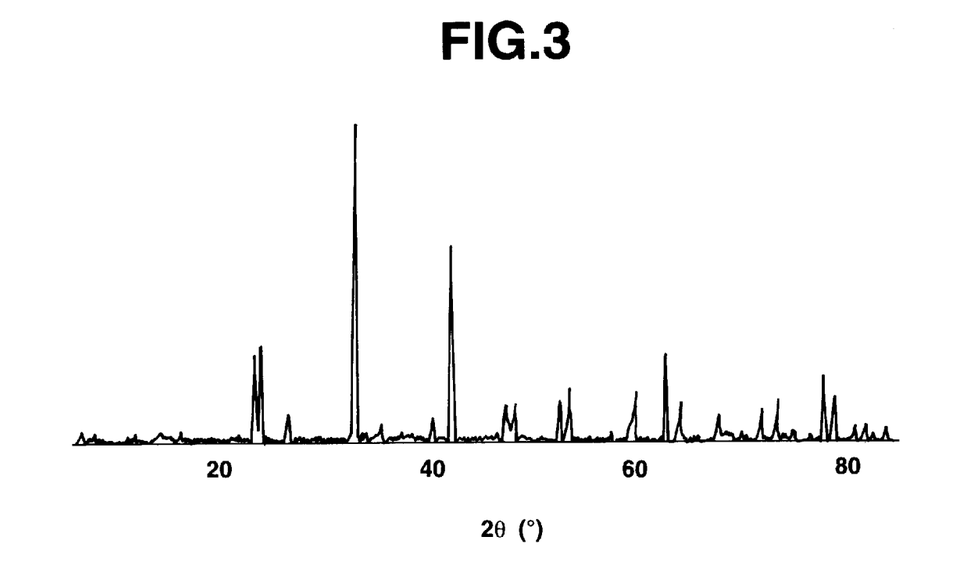
FIG. 3 is an X-ray diffraction pattern showing a crystal structure of yellow pigment particles obtained in Example 8.
Figure 4:
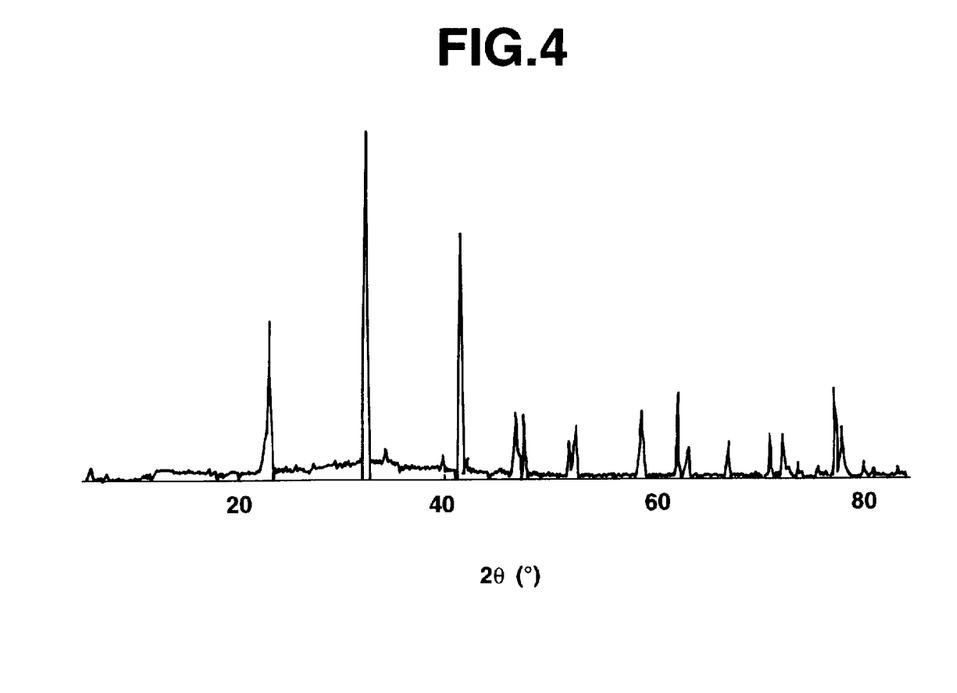
FIG. 4 is an X-ray diffraction pattern showing a crystal structure of yellow pigment particles obtained in Example 10.
Figure 5:
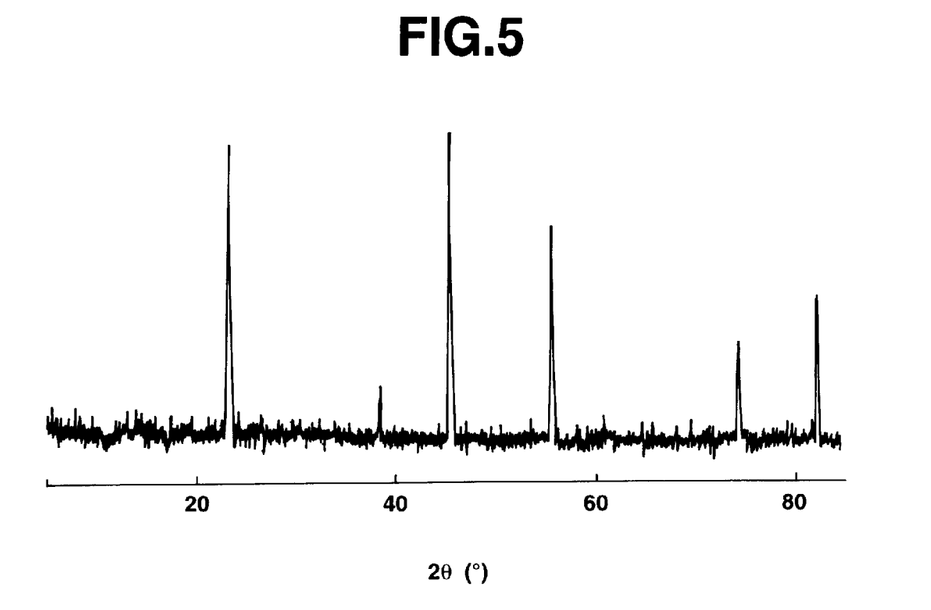
FIG. 5 is an X-ray diffraction pattern showing a crystal structure of pigment particles obtained in Comparative Example 5.
Figure 6:
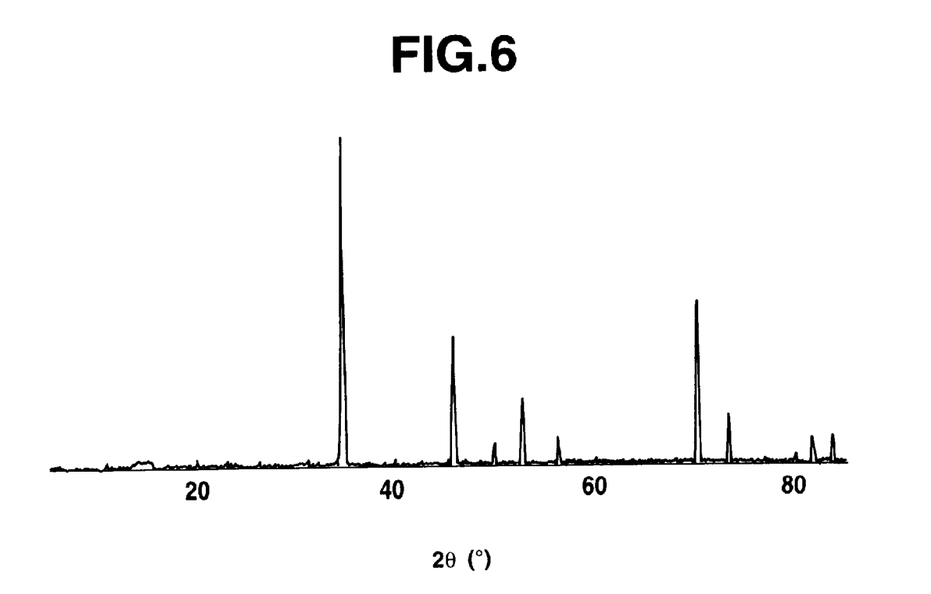
FIG. 6 is an X-ray diffraction pattern showing a crystal structure of pigment particles obtained in Comparative Example 6.

The thus obtained pigment particles had an average particle size of 1.0 μm, a BET specific surface area of 2.7 $m^2/g$ and a true specific gravity of 3.7. The composition percentage of Fe therein was 20.6 atm %, the composition percentage of Ti therein was 61.0 atm %, and the composition percentage of Li therein was 18.4 atm %. From the X-ray diffraction pattern shown in FIG. 1, it was confirmed that the pigment particles was constituted by a single crystal phase having a pseudobrookite-type structure. As to the lattice constants of the crystal phase, "a" was 0.966 nm; "b" was 0.990 nm; and "c" was 0.374 nm.

In addition, the obtained pigment particles exhibited a clear yellow color. As to the color tone of the pigment particles according to a "Lab" colorimetric method, the L* value was 71.7; the a* value was 13.2; the b* value was 48.2; the C* value (chroma) was 50.0; and the H* value (hue) was 74.7. The pigment particles showed a good heat resistance, because no discoloration or color degradation was caused until the temperature reached 700° C. Further, the pigment particles showed a good chemical resistance, because no change in color tone thereof was observed when the pigment particles were subjected to both acid-resistant and alkali-resistant tests. As to the light resistance of the pigment particles, as a result of an accelerated exposure test, it was confirmed that the percentage of reduction in gloss was as low as 15%.

<Production of Yellow Paint for Road-signs>

The above-obtained yellow pigment particles were kneaded with the other paint components shown below at the specified mixing ratio, thereby producing a kneaded material.

Composition of Paint

| | |
|---|---|
| Yellow pigment particles | 4% by weight |
| Glass beads | 16% by weight |
| Calcium carbonate | 32% by weight |
| Salt water | 32% by weight |
| Petroleum resin | 13.7% by weight |
| Plasticizer | 2.3% by weight |

The kneaded material was heat-melted at 250° C., thereby obtaining a yellow paint for road-signs. The obtained yellow paint for road-signs also exhibited the same clear yellow color as that of the pigment particles used, even after heat-melted at 250° C.

EXAMPLES 2 TO 10 AND COMPARATIVE EXAMPLES 1 TO 9

<Production of Heat-resistant Yellow Pigment Particles>

The same procedure as defined in Example 1 was conducted except that addition or non-addition, kind, mixing percentage and heat-calcining temperature of the Fe compound, the Ti compound, the Li compound, the Al compound and the Mg compound as raw materials were varied, thereby producing pigment particles.

Production conditions and various properties of the obtained pigment particles are shown in Tables 1 to 4.

TABLE 1

Production conditions of heat-resistant yellow pigment particles

| | Iron compound | | Titanium compound | |
|---|---|---|---|---|
| Examples | Kind | Mixing ratio of Fe (atm %) | Kind | Mixing ratio of Ti (atm %) |
| Example 2 | Goethite | 27.0 | Titanium dioxide | 55.0 |
| Example 3 | Goethite | 37.0 | Titanium dioxide | 50.0 |
| Example 4 | Hematite | 46.7 | Titanium dioxide | 46.7 |
| Example 5 | Magnetite | 35.0 | Titanium dioxide | 50.0 |
| Example 6 | Goethite | 16.1 | Titanium dioxide | 60.9 |
| Example 7 | Goethite | 28.8 | Titanium dioxide | 51.3 |
| Example 8 | Hematite | 20.0 | Titanium dioxide | 40.0 |
| Example 9 | Hematite | 26.7 | Titanium dioxide | 26.7 |
| Example 10 | Magnetite | 26.7 | Titanium dioxide | 53.3 |

Production conditions of heat-resistant yellow pigment particles

| | Lithium compound | | Aluminum compound | |
|---|---|---|---|---|
| Examples | Kind | Mixing ratio of Li (atm %) | Kind | Mixing ratio of Al (atm %) |
| Example 2 | Lithium carbonate | 16.0 | — | — |
| Example 3 | Lithium carbonate | 13.0 | — | — |
| Example 4 | Lithium carbonate | 6.6 | — | — |
| Example 5 | Lithium carbonate | 15.0 | — | — |

TABLE 1-continued

| Example 6 | Lithium carbonate. | 13.4 | — | — |
|---|---|---|---|---|
| Example 7 | Lithium carbonate | 7.1 | — | — |
| Example 8 | Lithium carbonate | 20.0 | Al(OH)$_3$ | 20.0 |
| Example 9 | Lithium carbonate | 20.0 | Al$_2$O$_3$ | 26.7 |
| Example 10 | Lithium carbonate | 6.6 | Al(OH)$_3$ | 6.7 |

Production conditions of heat-resistant yellow pigment particles

| | Magnesium compound | | Heat-calcination | |
|---|---|---|---|---|
| Examples | Kind | Mixing ratio of Mg (atm %) | Atmosphere | Temperature (° C.) |
| Example 2 | — | — | In air | 890 |
| Example 3 | — | — | In air | 870 |
| Example 4 | — | — | In air | 850 |
| Example 5 | — | — | In air | 900 |
| Example 6 | Mg(OH)$_2$ | 9.6 | In air | 870 |
| Example 7 | Mg(OH)$_2$ | 12.8 | In air | 920 |
| Example 8 | — | — | In air | 950 |
| Example 9 | — | — | In air | 980 |
| Example 10 | Mg(OH)$_2$ | 6.7 | In air | 900 |

TABLE 2

Production conditions of heat-resistant yellow pigment particles

| | Iron compound | | Titanium compound | |
|---|---|---|---|---|
| Comparative Examples | Kind | Mixing ratio of Fe (atm %) | Kind | Mixing ratio of Ti (atm %) |
| Comparative Example 1 | Goethite | 14.0 | Titanium dioxide | 63.0 |
| Comparative Example 2 | Goethite | 23.8 | Titanium dioxide | 71.2 |
| Comparative Example 3 | Goethite | 18.7 | Titanium dioxide | 56.3 |
| Comparative Example 4 | Goethite | 17.5 | Titanium dioxide | 52.5 |
| Comparative Example 5 | Goethite | 15.0 | Titanium dioxide | 45.0 |
| Comparative Example 6 | Goethite | 2.7 | Titanium dioxide | 95.4 |
| Comparative Example 7 | Goethite | 33.3 | Titanium dioxide | 50.0 |
| Comparative Example 8 | Goethite | 33.3 | Titanium dioxide | 33.3 |
| Comparative Example 9 | Goethite | 40.0 | Titanium dioxide | 50.0 |

Production conditions of heat-resistant yellow pigment particles

| | Lithium compound | | Aluminum compound | |
|---|---|---|---|---|
| Examples | Kind | Mixing ratio of Li (atm %) | Kind | Mixing ratio of Al (atm %) |
| Comparative Example 1 | Lithium carbonate | 23.0 | — | — |
| Comparative Example 2 | Lithium carbonate | 5.0 | — | — |
| Comparative Example 3 | Lithium carbonate | 25.0 | — | — |
| Comparative | Lithium | 30.0 | — | — |

TABLE 2-continued

| Examples | | | | |
|---|---|---|---|---|
| Example 4 | carbonate | | | |
| Comparative Example 5 | Lithium carbonate | 40.0 | — | — |
| Comparative Example 6 | Lithium carbonate | 1.8 | — | — |
| Comparative Example 7 | — | — | — | — |
| Comparative Example 8 | — | — | Al(OH)$_3$ | 33.3 |
| Comparative Example 9 | — | — | — | — |

Production conditions of heat-resistant yellow pigment particles

| Examples | Magnesium compound Kind | Mixing ratio of Mg (atm %) | Heat-calcination Atmosphere | Temperature (° C.) |
|---|---|---|---|---|
| Comparative Example 1 | — | — | In air | 900 |
| Comparative Example 2 | — | — | In air | 900 |
| Comparative Example 3 | — | — | In air | 900 |
| Comparative Example 4 | — | — | In air | 900 |
| Comparative Example 5 | — | — | In air | 900 |
| Comparative Example 6 | — | — | In air | 900 |
| Comparative Example 7 | Mg(OH)$_2$ | 16.7 | In air | 900 |
| Comparative Example 8 | — | — | In air | 900 |
| Comparative Example 9 | MgO | 10.0 | In air | 1,000 |

TABLE 3

Properties of yellow pigment particles

| Examples | Average particle size (μm) | True specific gravity (g/cc) | Fe content (atm %) | Ti content (atm %) |
|---|---|---|---|---|
| Example 2 | 0.9 | 3.8 | 27.3 | 57.8 |
| Example 3 | 0.8 | 4.0 | 37.1 | 50.5 |
| Example 4 | 0.6 | 4.2 | 47.1 | 46.9 |
| Example 5 | 0.7 | 4.0 | 35.2 | 50.3 |
| Example 6 | 0.7 | 3.7 | 16.0 | 61.0 |
| Example 7 | 0.8 | 3.9 | 28.6 | 51.4 |
| Example 8 | 0.7 | 3.5 | 19.9 | 40.1 |
| Example 9 | 0.6 | 3.5 | 26.6 | 26.8 |
| Example 10 | 0.9 | 3.9 | 26.6 | 53.4 |

Properties of yellow pigment particles

| Examples | Li content (atm %) | Al content (atm %) | Mg content (atm %) |
|---|---|---|---|
| Example 2 | 14.9 | — | — |
| Example 3 | 12.4 | — | — |
| Example 4 | 6.0 | — | — |
| Example 5 | 14.5 | — | — |
| Example 6 | 13.3 | — | 9.7 |
| Example 7 | 7.0 | — | 13.0 |
| Example 8 | 19.8 | 20.2 | — |
| Example 9 | 19.7 | 26.9 | — |
| Example 10 | 6.7 | 6.8 | 6.7 |

TABLE 3-continued

Properties of yellow pigment particles — Crystal phase

| Examples | Pseudo-brookite-type structure (vol. %) | Rutile-type structure (vol. %) | Spinel-type structure (vol. %) | Hematite (vol. %) | MgO (vol. %) |
|---|---|---|---|---|---|
| Example 2 | 100 | 0 | 0 | 0 | 0 |
| Example 3 | 100 | 0 | 0 | 0 | 0 |
| Example 4 | 92 | 8 | 0 | 0 | 0 |
| Example 5 | 96 | 0 | 4 | 0 | 0 |
| Example 6 | 100 | 0 | 0 | 0 | 0 |
| Example 7 | 100 | 0 | 0 | 0 | 0 |
| Example 8 | 100 | 0 | 0 | 0 | 0 |
| Example 9 | 100 | 0 | 0 | 0 | 0 |
| Example 10 | 100 | 0 | 0 | 0 | 0 |

Properties of yellow pigment particles — Colorimetric values

| Examples | L* | a* | b* | C* | H* |
|---|---|---|---|---|---|
| Example 2 | 61.5 | 19.4 | 50.2 | 53.8 | 68.9 |
| Example 3 | 61.4 | 20.8 | 51.1 | 55.5 | 67.9 |
| Example 4 | 49.5 | 20.5 | 38.8 | 43.9 | 62.1 |
| Example 5 | 61.5 | 19.4 | 50.2 | 53.8 | 68.9 |
| Example 6 | 79.0 | 8.7 | 45.0 | 45.8 | 79.1 |
| Example 7 | 67.8 | 16.1 | 52.0 | 54.1 | 72.7 |
| Example 8 | 67.5 | 15.2 | 46.0 | 48.1 | 71.5 |
| Example 9 | 63.5 | 19.6 | 47.0 | 51.3 | 67.5 |
| Example 10 | 64.5 | 17.2 | 49.0 | 52.1 | 70.7 |

Properties of yellow pigment particles

| Examples | Color tone | Heat resistance (° C.) |
|---|---|---|
| Example 2 | Clear yellow | 700 |
| Example 3 | Clear yellow | 700 |
| Example 4 | Clear yellow | 700 |
| Example 5 | Clear yellow | 700 |
| Example 6 | Clear yellow | 700 |
| Example 7 | Clear yellow | 700 |
| Example 8 | Clear yellow | 700 |
| Example 9 | Clear yellow | 700 |
| Example 10 | Clear yellow | 700 |

Properties of yellow pigment particles

| Examples | Chemical resistance Acid resistance | Chemical resistance Alkali resistance | Light resistance (percentage of reduction in gloss) (%) |
|---|---|---|---|
| Example 2 | o | o | 13 |
| Example 3 | o | o | 12 |
| Example 4 | o | o | 18 |
| Example 5 | o | o | 13 |
| Example 6 | o | o | 11 |
| Example 7 | o | o | 10 |
| Example 8 | o | o | 12 |
| Example 9 | o | o | 14 |
| Example 10 | o | o | 12 |

TABLE 4

Properties of yellow pigment particles

| Comparative Examples | Average particle size (μm) | True specific gravity (g/cc) | Fe content (atm %) | Ti content (atm %) |
|---|---|---|---|---|
| Comparative Example 1 | 0.9 | 3.6 | 14.3 | 64.3 |
| Comparative Example 2 | 1.0 | 4.1 | 23.9 | 71.3 |
| Comparative Example 3 | 1.2 | 3.6 | 18.9 | 57.0 |
| Comparative Example 4 | 1.1 | 3.6 | 18.2 | 53.5 |
| Comparative Example 5 | 1.3 | 3.7 | 16.0 | 47.5 |
| Comparative Example 6 | 0.8 | 4.2 | 2.8 | 95.5 |
| Comparative Example 7 | 0.5 | 4.0 | 33.2 | 50.1 |
| Comparative Example 8 | 0.4 | 3.9 | 33.2 | 33.4 |
| Comparative Example 9 | 0.4 | 4.1 | 39.8 | 50.2 |

Properties of yellow pigment particles

| Comparative Examples | Li content (atm %) | Al content (atm %) | Mg content (atm %) |
|---|---|---|---|
| Comparative Example 1 | 21.4 | — | — |
| Comparative Example 2 | 4.8 | — | — |
| Comparative Example 3 | 24.1 | — | — |
| Comparative Example 4 | 28.3 | — | — |
| Comparative Example 5 | 36.5 | — | — |
| Comparative Example 6 | 1.7 | — | — |
| Comparative Example 7 | 0.0 | 0.0 | 16.7 |
| Comparative Example 8 | 0.0 | 33.3 | 0.0 |
| Comparative Example 9 | 0.0 | 0.0 | 10.0 |

Properties of yellow pigment particles
Crystal phase

| Comparative Examples | Pseudo-brookite-type structure (vol. %) | Rutile-type structure (vol. %) | Spinel-type structure (vol. %) | Hematite (vol. %) | MgO (vol. %) |
|---|---|---|---|---|---|
| Comparative Example 1 | 87 | 6 | 7 | 0 | 0 |
| Comparative Example 2 | 42 | 58 | 0 | 0 | 0 |
| Comparative Example 3 | 70 | 0 | 30 | 0 | 0 |
| Comparative Example 4 | 65 | 0 | 35 | 0 | 0 |
| Comparative Example 5 | 0 | 0 | 100 | 0 | 0 |
| Comparative Example 6 | 0 | 100 | 0 | 0 | 0 |
| Comparative Example 7 | 70 | 15 | 0 | 10 | 5 |
| Comparative Example 8 | 60 | 30 | 0 | 10 | 0 |
| Comparative Example 9 | 55 | 20 | 0 | 20 | 5 |

Properties of yellow pigment particles
Colorimetric values

| Comparative Examples | L* | a* | b* | C* | H* |
|---|---|---|---|---|---|
| Comparative Example 1 | 77.0 | 7.6 | 43.5 | 44.2 | 80.2 |
| Comparative Example 2 | 65.6 | 19.2 | 47.4 | 51.2 | 67.9 |
| Comparative Example 3 | 69.8 | 13.5 | 45.2 | 47.2 | 73.4 |
| Comparative Example 4 | 66.0 | 17.3 | 41.8 | 45.2 | 67.5 |
| Comparative Example 5 | 61.4 | 19.4 | 32.8 | 38.1 | 59.4 |
| Comparative Example 6 | 87.5 | −3.2 | 13.0 | 13.4 | 103.8 |
| Comparative Example 7 | 53.9 | 25.3 | 30.0 | 39.5 | 50.2 |
| Comparative Example 8 | 56.0 | 24.0 | 41.0 | 47.1 | 59.4 |
| Comparative Example 9 | 46.1 | 32.6 | 31.0 | 44.8 | 43.4 |

Properties of yellow pigment particles

| Comparative Examples | Color tone | Heat resistance (° C.) |
|---|---|---|
| Comparative Example 1 | Light yellow | 700 |
| Comparative Example 2 | Clear yellow | 700 |
| Comparative Example 3 | Brownish yellow | 700 |
| Comparative Example 4 | Brownish yellow | 700 |
| Comparative Example 5 | Brown | 700 |
| Comparative Example 6 | Thin green | 700 |
| Comparative Example 7 | Orange | 700 |
| Comparative Example 8 | Reddish yellow | 700 |
| Comparative Example 9 | Orange | 650 |

Properties of yellow pigment particles

| Comparative Examples | Chemical resistance | | Light resistance (percentage of reduction in gloss) (%) |
|---|---|---|---|
| | Acid resistance | Alkali resistance | |
| Comparative Example 1 | Δ | o | 15 |
| Comparative Example 2 | o | o | 28 |
| Comparative Example 3 | ' | o | 16 |
| Comparative Example 4 | ' | o | 17 |
| Comparative Example 5 | x | o | 18 |
| Comparative Example 6 | o | o | 35 |
| Comparative Example 7 | o | o | 27 |
| Comparative Example 8 | o | o | 24 |
| Comparative Example 9 | o | o | 25 |

Incidentally, as shown in Examples 2, 3 and 6 to 10, in the case where the contents of Fe, Ti and Li were identical to those represented by the points (20.6, 61.0, 18.4), (27.3, 57.8, 14.9) and (37.1, 50.5, 12.4) in which numbers in each parenthesis represent atom percentages of Fe, Ti and Li in this order by using as the corresponding coordinates in the triangular phase diagram, it was confirmed that the obtained pigment particles were constituted by a single crystal phase having a pseudobrookite-type structure.

FIGS. 2 to 6 show X-ray diffraction patterns of pigment particles obtained in Examples 7, 8 and 10 and Comparative Examples 5 and 6. From FIGS. 2 to 4, it was confirmed that all of the pigment particles obtained in Examples 7, 8 and 10, were constituted by a single crystal phase having a pseudobrookite-type structure. On the other hand, from FIG. 5, it was confirmed that the pigment particles obtained in Comparative Example 5 were constituted by a single crystal phase having a spinel-type structure. Further, from FIG. 6, it was confirmed that the pigment particles obtained in Comparative Example 6 were constituted by a single crystal phase having a rutile-type structure.

EXAMPLE 11
<Production of Solvent-based Paint Using Heat-resistant Yellow Pigment Particles>

10 g of the heat-resistant yellow pigment particles obtained in Example 2 were mixed with an amino-alkyd resin and a thinner at the below-specified ratio. The mixture was added along with 90 g of 3 mmφ glass beads into a 140-ml glass bottle, and intimately mixed and dispersed together with by a paint shaker for 90 minutes, thereby producing a mill base.

Composition of Mill Base

| | |
|---|---|
| Heat-resistant yellow pigment particles | 12.2 parts by weight |
| Amino-alkyd resin (Tradename: AMIRAC No. 1026 produced by Kansai Paint Co., Ltd.) | 19.5 parts by weight |
| Thinner | 7.3 parts by weight |

The thus obtained mill base and an amino-alkyd resin were blended together at the below-specified ratio, and further intimately mixed and dispersed together by a paint shaker for 15 minutes to prepare a solvent-based paint containing the heat-resistant yellow pigment particles.

Composition of Solvent-based Paint

| | |
|---|---|
| Mill base | 39.0 parts by weight |
| Amino-alkyd resin (Tradename: AMIRAC No. 1026 produced by Kansai Paint Co., Ltd.) | 61.0 parts by weight |

The thus obtained solvent-based paint had a viscosity of 1,750 cP.

Next, the solvent-based paint was applied onto a cold-rolled steel plate (having a size of 0.8 mm×70 mm×150 mm: JIS G-3141) and then dried to form a coating film having a thickness of 150 μm thereon. The thus obtained coating film exhibited a gloss of 54% and a heat-resisting temperature of 292° C. As to the hue of the obtained coating film, the L* value was 61.6; the a* value was 19.3; and the b* value was 50.4.

EXAMPLES 12 TO 15 AND COMPARATIVE EXAMPLES 10 AND 11

The same procedure as defined in Example 11 was conducted except that kinds of the heat-resistant yellow pigment particles used were varied, thereby producing solvent-based paints.

Main production conditions and various properties of the obtained coating films are shown in Table 5.

TABLE 5

| | Production of solvent-based paint | | |
|---|---|---|---|
| Examples and Comparative Examples | Kinds of heat-resistant yellow pigment | Kinds of resin | Properties of paint Viscosity (cP) |
| Example 11 | Example 2 | Amino-alkyd resin | 1,750 |
| Example 12 | Example 4 | Amino-alkyd resin | 1,680 |
| Example 13 | Example 6 | Amino-alkyd resin | 1,820 |
| Example 14 | Example 8 | Amino-alkyd resin | 1,830 |
| Example 15 | Example 10 | Amino-alkyd resin | 1,690 |
| Comparative Example 10 | LL-XLO | Amino-alkyd resin | 2,430 |
| Comparative Example 11 | T-10 | Amino-alkyd resin | 2,480 |

| | Properties of coating film | | | |
|---|---|---|---|---|
| Examples and Comparative Examples | Heat-resisting temperature of coating film (° C.) | Hue | | |
| | | L* value | a* value | b* value |
| Example 11 | 292 | 61.6 | 19.3 | 50.4 |
| Example 12 | 290 | 49.3 | 20.4 | 38.9 |
| Example 13 | 288 | 79.7 | 8.8 | 45.3 |
| Example 14 | 291 | 67.4 | 15.3 | 46.4 |
| Example 15 | 295 | 63.9 | 17.2 | 49.3 |
| Comparative Example 10 | 212 | 63.0 | 17.3 | 52.5 |
| Comparative Example 11 | 265 | 52.2 | 26.0 | 42.0 |

In Comparative Examples 10 and 11, as the yellow pigment particles, there were used commercially-available yellow goethite (α-FeOOH) pigment particles (Tradename: "LL-XLO", produced by Titan Kogyo Co., Ltd.) and commercially-available yellow-brownish TAN pigment particles (Tradename: "T-10", produced by Titan Kogyo Co., Ltd., Chemical composition: $ZnO.Fe_2O_3$), respectively.

As shown in Table 5, the heat-resisting temperatures of the coating films obtained in Examples 11 to 15 were higher by not less than 23° C., than that using the commercially-available TAN pigment particles. Further, it was recognized that the coating films obtained in Examples 11 to 15 showed a hue close to that of the commercially-available yellow goethite (α-FeOOH) pigment particles.

EXAMPLE 16
<Production of Water-based Paint Using Heat-resistant Yellow Pigment Particles>

7.62 g of the heat-resistant yellow pigment particles obtained in Example 2 were mixed with a water-soluble alkyd resin, etc., at the below-specified ratio. The mixture was added along with 90 g of 3 mm$\phi$ glass beads into a 140-ml glass bottle, and intimately mixed and dispersed together with by a paint shaker for 90 minutes, thereby producing a mill base.

Composition of Mill Base

| | |
|---|---|
| Heat-resistant yellow pigment particles | 12.4 parts by weight |
| Water-soluble alkyd resin (Tradename: S-118 produced by Dai-Nippon Ink Kagaku Co., Ltd.) | 9.0 parts by weight |
| Antifoaming agent (Tradename: NOPCO 8034 produced by Sun-Nopco Co., Ltd.) | 4.8 part by weight |
| Water | 4.8 parts by weight |
| Butyl Cellosolve | 4.1 parts by weight |

The thus obtained mill base and other components shown below were blended together at the below-specified ratio, and further intimately mixed and dispersed together by a paint shaker for 15 minutes, thereby producing a water-based paint.

Composition of Water-based Paint

| | |
|---|---|
| Mill base | 30.4 parts by weight |
| Water-soluble alkyd resin (Tradename: S-118 produced by Dai-Nippon Ink Kagaku Co., Ltd.) | 46.2 parts by weight |
| Water-soluble melamine resin (Tradename: S-695 produced by Dai-Nippon Ink Kagaku Co., Ltd.) | 12.6 parts by weight |
| Antifoaming agent (Tradename: NOPCO 8034 produced by Sun-Nopco Co., Ltd.) | 0.1 part by weight |
| Water | 9.1 parts by weight |
| Butyl Cellosolve | 1.6 parts by weight |

The thus obtained water-based paint had a viscosity of 1,280 cP.

Next, the water-based paint was applied onto a cold-rolled steel plate (having a size of 0.8 mm×70 mm×150 mm: JIS G-3141) and then dried to form a coating film having a thickness of 150 $\mu$m thereon. The thus obtained coating film exhibited a gloss of 52% and a heat-resisting temperature of 293° C. As to the hue of the obtained coating film, the L* value was 61.4; the a* value was 19.5; and the b* value was 50.1.

EXAMPLES 17 TO 20 AND COMPARATIVE EXAMPLES 12 AND 13

The same procedure as defined in Example 16 was conducted except that kinds of the heat-resistant yellow pigment particles used were varied, thereby producing water-based paints.

Main production conditions and various properties of the obtained coating films are shown in Table 6.

TABLE 6

| | Production of water-based paint | | |
|---|---|---|---|
| Examples and Comparative Examples | Kinds of heat-resistant yellow pigment | Kinds of resin | Properties of paint Viscosity (cP) |
| Example 16 | Example 2 | Water-soluble amino-alkyd resin Water-soluble melamine resin | 1,280 |
| Example 17 | Example 4 | Water-soluble amino-alkyd resin Water-soluble melamine resin | 1,230 |
| Example 18 | Example 6 | Water-soluble amino-alkyd resin Water-soluble melamine resin | 1,310 |
| Example 19 | Example 8 | Water-soluble amino-alkyd resin Water-soluble melamine resin | 1,320 |
| Example 20 | Example 10 | Water-soluble amino-alkyd resin Water-soluble melamine resin | 1,270 |
| Comparative Example 12 | LL-XLO | Water-soluble amino-alkyd resin Water-soluble melamine resin | 1,900 |
| Comparative Example 13 | T-10 | Water-soluble amino-alkyd resin Water-soluble melamine resin | 1,930 |

| | Properties of coating film | | | |
|---|---|---|---|---|
| Examples and Comparative Examples | Heat-resisting temperature of coating film (° C.) | Hue L* value | a* value | b* value |
| Example 16 | 293 | 61.4 | 19.5 | 50.1 |
| Example 17 | 293 | 49.8 | 20.5 | 38.9 |
| Example 18 | 289 | 79.2 | 8.5 | 45.2 |
| Example 19 | 290 | 67.6 | 15.4 | 46.2 |
| Example 20 | 294 | 64.6 | 17.0 | 48.8 |
| Comparative Example 12 | 216 | 62.6 | 17.2 | 52.6 |
| Comparative Example 13 | 267 | 52.1 | 26.1 | 41.8 |

In Comparative Examples 12 and 13, as the yellow pigment particles, there were used commercially-available yellow goethite ($\alpha$-FeOOH) pigment particles (Tradename: "LL-XLO", produced by Titan Kogyo Co., Ltd.) and commercially-available yellow-brownish TAN pigment particles (Tradename: "T-10", produced by Titan Kogyo Co., Ltd., Chemical composition: $ZnO \cdot Fe_2O_3$), respectively.

As shown in Table 6, the heat-resisting temperatures of coating films obtained in Examples 16 to 20, were higher by not less than 22° C., than that using the commercially-available TAN pigment particles. Further, it was recognized that the coating films obtained in Examples 16 to 20 showed a hue close to that of the commercially-available yellow goethite ($\alpha$-FeOOH) pigment particles.

EXAMPLE 21

<Production of Resin Composition Using a Polyvinyl Chloride Resin as a Resin Component>

0.4 g of the heat-resistant yellow pigment particles obtained in Example 2, 40 g of polyvinyl chloride resin particles 103EP8D (produced by Nippon Zeon Co., Ltd.) and 20 g of dioctyl phthalate (DOP) (produced by Dai-Hachi Kagaku Kogyo Co., Ltd.) were weighed, charged into a 200-ml polybeaker and intimately mixed together by a spatula, thereby obtaining mixed particles.

The thus obtained particles were mixed with 0.4 g of calcium stearate. The mixture was gradually supplied to hot rolls which were heated at 160° C. and whose clearance was set to 0.2 mm, and continuously kneaded together until a uniform resin composition was obtained. Thereafter, the obtained resin composition was separated from the hot rolls.

Next, the above-mentioned resin composition was pressed by a hot press, thereby obtaining a sheet piece having a thickness of 1.5 mm. The pressing conditions were as follows: press temperature: 160° C.; press force: 100 kg/cm$^2$; press time: one minute; press gap: 1.0 mm, press capacity: 30 g.

As to the heat resistance of the sheet piece, the time required until the resin was blackened, was as long as not less than 360 minutes. In addition, as to the hue of the sheet piece, the L* value was 61.7; the a* value was 19.2; and the b* value was 50.8.

EXAMPLES 22 TO 25 AND COMPARATIVE EXAMPLES 14 AND 15

The same procedure as defined in Example 21 was conducted except that kinds of the heat-resistant yellow pigment particles used were varied, thereby producing sheet pieces.

Main production conditions and various properties of the obtained sheet pieces are shown in Tables 7 and 8.

TABLE 7

| Examples and Comparative Examples | Kind of heat-resistant yellow pigment | Amount (part by weight) | Kind of resin | Amount (part by weight) |
|---|---|---|---|---|
| Example 21 | Example 2 | 0.4 | Polyvinyl chloride resin | 40 |
| Example 22 | Example 4 | 0.4 | Polyvinyl chloride resin | 40 |
| Example 23 | Example 6 | 0.4 | Polyvinyl chloride resin | 40 |
| Example 24 | Example 8 | 0.4 | Polyvinyl chloride resin | 40 |
| Example 25 | Example 10 | 0.4 | Polyvinyl chloride resin | 40 |
| Comparative Example 14 | LL-XLO | 0.4 | Polyvinyl chloride resin | 40 |
| Comparative Example 15 | TAN | 0.4 | Polyvinyl chloride resin | 40 |

| Examples and Comparative Examples | Kind of plasticizer | Amount of (part by weight) | Kind of additives | Amount of (part by weight) | Kneading temperature (° C.) |
|---|---|---|---|---|---|
| Example 21 | DOP | 20 | Calcium stearate | 0.4 | 160 |
| Example 22 | DOP | 20 | Calcium stearate | 0.4 | 160 |
| Example 23 | DOP | 20 | Calcium stearate | 0.4 | 160 |
| Example 24 | DOP | 20 | Calcium stearate | 0.4 | 160 |
| Example 25 | DOP | 20 | Calcium stearate | 0.4 | 160 |
| Comparative Example 14 | DOP | 20 | Calcium stearate | 0.4 | 160 |
| Comparative Example 15 | DOP | 20 | Calcium stearate | 0.4 | 160 |

TABLE 8

| Examples and Comparative Examples | Properties of resin composition | | | | |
|---|---|---|---|---|---|
| | Dispersing state | Resin blackening time (min.) | Hue L* value | Hue a* value | Hue b* value |
| Example 21 | 4 | ≧360 | 61.7 | 19.2 | 50.8 |
| Example 22 | 5 | ≧360 | 49 | 20.2 | 39.1 |
| Example 23 | 5 | ≧360 | 79.5 | 8.7 | 45.4 |
| Example 24 | 5 | ≧360 | 67.4 | 15 | 46.3 |
| Example 25 | 5 | ≧360 | 63 | 17.1 | 49.4 |
| Comparative Example 14 | 4 | 210 | 62.9 | 17.4 | 52.4 |
| Comparative Example 15 | 3 | 180 | 52.2 | 26.0 | 42.0 |

As shown in Tables 7 and 8, the heat-resisting time of the sheet pieces obtained in Examples 21 to 25, i.e., the time required until these sheet pieces were blackened upon heating, were as long as not less than 360 minutes which were longer by not less than 150 minutes than that using the commercially-available TAN pigment particles. Further, it was recognized that the sheet pieces obtained in Examples 21 to 25 showed a hue close to that of the commercially-available yellow goethite (α-FeOOH) pigment particles.

EXAMPLE 26

<Production of Resin Composition Using a Low-density Polyethylene Resin as a Resin Component>

0.5 g of the heat-resistant yellow pigment particles obtained in Example 1 and 50 g of low-density polyethylene resin particles TL-116 (produced by Nippon Zeon Co., Ltd.) were weighed, charged into a 200-ml polybeaker and intimately mixed together by a spatula, thereby obtaining mixed particles.

The thus obtained particles were mixed with 0.1 g of calcium stearate. The mixture was gradually supplied to hot rolls which were heated at 120° C. and whose clearance was set to 0.5 mm, and continuously kneaded together until a uniform resin composition was obtained. Thereafter, the obtained resin composition was separated from the hot rolls.

Next, the above-mentioned resin composition was pressed by a hot press, thereby obtaining a sheet piece having a thickness of 1.5 mm. The pressing conditions were as follows: press temperature: 120° C.; press force: 100 kg/cm$^2$; press time: one minute; press gap: 1.0 mm, press capacity: 20 g.

As to the hue of the sheet piece, the L* value was 61.5; the a* value was 19.0; and the b* value was 50.2.

EXAMPLES 27 TO 30 AND COMPARATIVE EXAMPLES 16 AND 17

The same procedure as defined in Example 26 was conducted except that kinds of the heat-resistant yellow pigment particles used were varied, thereby producing sheet pieces.

Main production conditions and various properties of the obtained sheet pieces are shown in Tables 9 and 10.

TABLE 9

| Examples and Comparative Examples | Production of resin composition | | | |
|---|---|---|---|---|
| | Kind of heat-resistant yellow pigment | Amount (part by weight) | Kind of resin | Amount (part by weight) |
| Example 26 | Example 2 | 0.4 | Low-density polyethylene resin | 60 |
| Example 27 | Example 4 | 0.4 | Low-density polyethylene resin | 60 |
| Example 28 | Example 6 | 0.4 | Low-density polyethylene resin | 60 |
| Example 29 | Example 8 | 0.4 | Low-density polyethylene resin | 60 |
| Example 30 | Example 10 | 0.4 | Low-density polyethylene resin | 60 |
| Comparative Example 16 | LL-XLO | 0.4 | Low-density polyethylene resin | 60 |
| Comparative Example 17 | TAN | 0.4 | Low-density polyethylene resin | 60 |

| Examples and Comparative Examples | Production of resin composition | | | | |
|---|---|---|---|---|---|
| | Kind of plasticizer | Amount of (part by weight) | Kind of additives | Amount of (part by weight) | Kneading temperature (° C.) |
| Example 26 | — | — | Calcium stearate | 0.2 | 120 |
| Example 27 | — | — | Calcium stearate | 0.2 | 120 |
| Example 28 | — | — | Calcium stearate | 0.2 | 120 |
| Example 29 | — | — | Calcium stearate | 0.2 | 120 |
| Example 30 | — | — | Calcium stearate | 0.2 | 120 |
| Comparative Example 16 | — | — | Calcium stearate | 0.2 | 120 |
| Comparative Example 17 | — | — | Calcium stearate | 0.2 | 120 |

TABLE 10

| Examples and Comparative Examples | Properties of resin composition | | | | |
|---|---|---|---|---|---|
| | Resin blackening | | Hue | | |
| | Dispersing state | time (min.) | L* value | a* value | b* value |
| Example 26 | 4 | — | 61.5 | 19.0 | 50.2 |
| Example 27 | 5 | — | 48.5 | 20.1 | 38.7 |
| Example 28 | 5 | — | 79.0 | 8.5 | 45.0 |
| Example 29 | 5 | — | 67.0 | 14.7 | 46.0 |
| Example 30 | 5 | — | 62.2 | 16.8 | 49.0 |
| Comparative Example 16 | 4 | — | 62.7 | 17.1 | 51.9 |
| Comparative Example 17 | 3 | — | 52.1 | 25.7 | 41.3 |

What is claimed is:

1. Heat-resistant yellow pigment particles comprising a composite metal oxide containing Fe, Ti and Li, and comprising a crystal phase having a pseudobrookite-type structure and represented by the formula:

$$Fe_{2-x-y}Li_xTi_yTiO_5$$

wherein x is 0.15 to 0.66; and y is 0.2 to 0.86.

2. Heat-resistant yellow pigment particles according to claim 1, wherein the composition percentage of Fe is 17 to 55 atm %, the composition percentage of Ti is 40 to 62 atm %, and the composition percentage of Li is 5 to 22 atm %.

3. Heat-resistant yellow pigment particles according to claim 1, which further have an average particle size of 0.1 to 3 μm, a BET specific surface area of 0.5 to 20 m²/g, and a true specific gravity of 3.6 to 4.3.

4. Heat-resistant yellow pigment particles according to claim 1, wherein the composition percentages of Fe, Ti and Li fall within a range surrounded by a pentangular shape formed by connecting Point 1 (17, 62, 21), Point 2 (33, 62, 5), Point 3 (55, 40, 5), Point 4 (38, 40, 22) and Point 5 (17, 61, 22) in a triangular phase diagram indicating atom ratios of each metal element in the formula: $1/2(Fe_2O_3)$—$TiO_2$—$1/2(Li_2O)$, wherein numbers in a parenthesis of each point represent atom percentages of Fe, Ti and Li in this order by using as the corresponding coordinates in the triangular phase diagram.

5. Heat-resistant yellow pigment particles according to claim 1, wherein the content of said crystal phase having a pseudobrookite-type structure is not less than 80 volume % based on the volume of the whole crystal phase when calculated from an integrated intensity of X-ray diffraction pattern.

6. Heat-resistant yellow pigment particles according to claim 1, which further have an L* value of 48 to 85, an a* value of 8 to 25, a b* value of 38 to 55, a C* value (chroma) of 43 to 65, and an H* value (hue) of 62 to 85 when represented by L*a*b* method.

7. Heat-resistant yellow pigment particles according to claim 1, wherein at least a part of Fe, Ti or both Fe and Ti contained in the composite metal oxide particles is substituted with Al, Mg or both Al and Mg.

8. Heat-resistant yellow pigment particles according to claim 7, which wherein the composition percentage of Fe is 15 to 55 atm %, the composition percentage of Ti is 25 to 65 atm %, and the composition percentage of Li is 5 to 22 atm % and the content of Al is 1 to 30 atm %, calculated as Al, based on the whole metals, the content of Mg is 1 to 20 atm %, calculated as Mg, based on the whole metals, or the content of both Al and Mg is 1 to 30 atm %, calculated as Al and Mg, based on the whole metals.

9. Heat-resistant yellow pigment particles according to claim 7, wherein the composition of said crystal phase is represented by the formula:

$$Fe_{2-p-q-r-s}Li_pMg_qAl_rTi_sO_5$$

wherein p is more than 0.15 and less than 0.66; q is more than 0.03 and less than 0.60; r is more than 0.03 and less than 0.90; and s is more than 0.75 and less than 1.95.

10. A pigment comprising the heat-resistant yellow pigment particles set forth in claim 1.

11. A paint comprising the pigment set forth in claim 10 and a paint base material.

12. A paint according to claim 11, wherein the content of said pigment is 0.1 to 100 parts by weight based on 100 parts by weight of said paint base material.

13. A rubber or resin composition comprising the pigment set forth in claim 10 and a base material for the rubber or resin composition.

14. A rubber or resin composition according to claim 13, wherein the content of said pigment is 0.1 to 200 parts by weight based on 100 parts by weight of said base material for the rubber or resin composition.

* * * * *